US005832444A

United States Patent [19]

Schmidt

[11] Patent Number: 5,832,444

[45] Date of Patent: Nov. 3, 1998

[54] APPARATUS FOR DYNAMIC RANGE COMPRESSION OF AN AUDIO SIGNAL

[76] Inventor: Jon C. Schmidt, 8060 Niwot Rd, #73, Niwot, Colo. 80503

[21] Appl. No.: 709,851

[22] Filed: Sep. 10, 1996

[51] Int. Cl.[6] ........ G01L 3/00

[52] U.S. Cl. ........ 704/500; 704/503

[58] Field of Search ........ 381/106; 704/500, 704/503, 504, 501, 502, 224

[56] References Cited

U.S. PATENT DOCUMENTS

| | | | |
|---|---|---|---|
| 4,882,762 | 11/1989 | Waldhauer | 381/106 |
| 5,241,689 | 8/1993 | Sched et al. | 455/54.1 |
| 5,463,695 | 10/1995 | Werrbach | 381/106 |

*Primary Examiner*—Richemond Dorvil
*Attorney, Agent, or Firm*—Rudnick & Wolfe

[57] ABSTRACT

A dynamic range compression technique incorporates four novel concepts. The first is the use of a critical band multichannel structure for improved perceptual transparency. The second is the use of attack and release rates, instead of attack and release times, to affect gain control and adaptation of the compressor to changes in the input level. The third concept involves a level estimate control mode which permits increased adaptability using variable weightings of the contribution of both RMS and peak level estimates to gain control. Finally, the fourth concept involves the normalization of the level estimates to reduce or eliminate spectral distortion. These concepts provide a dynamic range compressor with improved perceptual transparency, especially with respect to music.

16 Claims, 5 Drawing Sheets

APPARATUS FOR DYNAMIC RANGE COMPRESSION OF AN AUDIO SIGNAL

FIELD OF THE INVENTION

The invention relates generally to the field of signal processing devices, particularly the field of dynamic range compression for audio signals. Specifically, the invention relates to a dynamic range compression system for improving the perceptual transparency of such systems.

BACKGROUND OF THE INVENTION

Fundamentally, dynamic range compression is the process of reducing the dynamic range of an audio signal. Compressors are typically constructed in the form of a gain adjusting device and a control system which controls the gain as a function of the input signal. Dynamic range compression reduces the level differences between the high and low intensity portions of an audio signal and is advantageous in applications where the signal processing capabilities of audio circuitry are too limited to process the full dynamic range of the input signal. Such applications include, for example, recording technologies, where the dynamic range of the recording media is limited, and hearing aid technologies which address impaired human hearing systems that are unable to sense the normal dynamic range of audio stimuli.

Perceptual transparency—the ability of a hearing aid to preserve the character of the input signal—is an ideal that is strived for in hearing aid compressor design. It has long been recognized that perceptual transparency across the entire spectrum of audio stimuli is difficult, if not impossible, to achieve. Thus, hearing aid compressor design has frequently focused on speech intelligibility as the primary design criterion. This has resulted in a compromise in the ability of hearing aids to achieve perceptual transparency for non-speech related audio stimuli, i.e. music. There is thus a need for an audio compression technique which improves the perceptual transparency of a broader range of audio signals.

It is known to provide multichannel compressors in order to more accurately preserve the character of an audio signal. Multichannel compressors filter the input signal into a number of bandwidths, creating individual amplitude envelopes which may be compressed independently. The individual amplitude envelopes are then combined to yield the audio output signal. Multichannel compression techniques such as that disclosed in U.S. Pat. No. 4,882,762 to Waldhauer, for example, offer the advantage of preserving the general amplitude envelope shape within each bandwidth, and thus the sound character.

Multichannel compression techniques, however, have heretofore been disadvantageous in that they alter the spectral distribution of the original signal and introduce spectral distortion. Spectral distortion arises when frequency bands having higher signal levels are more compressed than bands with lower signal levels. This results in an increase in high frequency content of the output signal. Multichannel compression techniques of the prior art have not adequately addressed the perceptual concerns associated with such spectral distortion. It is known that the human auditory system processes an audio signal by partitioning the signal into frequency bands and generating neural firings corresponding to the presence of signal components within each band. Research has shown that there exist between 26 and 32 critical bands with the approximate bandwidth of a critical band being ¼ octave for frequency bands above 700 Hz and 100 Hz for frequency bands below 700 Hz. Research on musical instrument synthesis has found that preserving the general shape of the amplitude envelopes is important for preserving the character of the sound. In many multichannel compressors of the prior art, every band undergoes an identical variation in level when the gain control of a single channel changes. That is, all frequencies within a given band experience the same gain variation. This gain variation occurs without regard to the critical bands of the human ear. The result is that audible aberrations may be imposed on the critical band envelopes. It is desired to provide a multichannel compression technique which reduces or eliminates the effects of spectral distortion and addresses the perceptual concerns related to the critical bands of the human auditory system.

Much effort in the prior art has been directed to achieving appropriate control of the gain in a compressor. Typically, the gain control signal of a compressor is generated based on an estimate of the input level. Level estimates are simply a useful way to describe the instantaneous behavior of the input signal. Thus, in any compressor, level estimation and the temporal characteristics of the gain control signal are interdependent, with the type of level estimate highly influencing the temporal control. Level estimates have traditionally been implemented using either the RMS power or peak level of the input signal. The RMS level reflects our perception of the loudness of the signal, while the peak level describes the instantaneous amplitude of the signal. Many prior art compression systems have utilized either RMS or peak level estimates, but not both, to achieve temporal control and have thus been characterized by a rather limited topology for level estimation. It is therefore desirable to provide an audio signal compression technique which offers a more versatile level estimation topology than prior art techniques.

Filter circuits have frequently been employed to achieve level estimation and temporal control of the gain in both analog and digital compression systems. Such RC circuits generate temporal control signals that may be described by an exponential decay of the form $e^{-alpha*T}$, where alpha is the RC time constant, and T is time. The response of filter-based gain controllers to changes in the input level signal are typically expressed in terms of attack and release times. Attack time refers to the time that it takes following an input level increase for the system output to change from its former gain value to a new gain value dictated by the input/output function. The input/output function is the compression curve that relates the input signal level to the output signal level. Typical input/output mapping curves are illustrated in FIG. 2. A shorter attack time provides protection against input signal spikes, or high level transients, because the system will adjust to the new gain in time to compress the input signal spike. However, short attack times may often result in loss of the "crispness" or "punchiness" of sounds such as percussion effects. Release time refers to the time that it takes, following an input level decrease, for the system output to change from its former gain value to a new gain value dictated by the input/output function. Short release times often lead to audible "breathing" effects when the input signal level drops below the threshold level required for compression to occur.

The use of attack and release times to characterize both digital and analog compression implementations is largely the result of a reliance on filter circuits for level estimation and temporal control. Interestingly, the exponential decay characteristic of filter-based controllers has no recognized relation to a desired gain control behavior, but has largely been relied upon as a matter of tradition and a consequence of the use of filter circuits to effect temporal control.

Moreover, the attack and release times of compressors utilizing filter-based gain controllers are dependent on the level of the input signal. For example, the attack times associated with higher level input signals will be shorter than those for lower level signals. Thus, the interdependency of the input signal level with attack and release times, and the interdependency of attack and release times themselves, results in a rather complicated compressor model when the gain controller is implemented in the form of a programmed digital computer. An audio signal compression system which provides a gain control protocol that is not dependent on the level of the input signal and is more computationally efficient than compression systems of the prior art is thus desired.

There have been attempts in the prior art to provide adaptable audio compressors which provide a more desirable perception over a wide range of audio signals. For example, U.S. Pat. No. 5,483,600 to Werrbach discloses an audio compression technique which adapts to the input signal using multiple, interactive layered time constants. Adaptation is based on signal level, transiency, peak factor and repetitiveness. The adaptation circuitry incorporates a filter equipped with multiple RC circuits to implement the multiple interactive time constants. The filter adapts to the transient nature of the input signal so that the compressor reacts in an optimum fashion, for example, to reduce transient amplitude without listener detectable reductions in the average sound levels proximate to a transient peak. This technique offers limited adaptability, however, in that the RC-based gain control is dependent on the level of the input signal. Moreover, adaptability is further limited because the attack and release times of the compressor and the input signal level estimation topology operate in a fixed relationship with respect to one another.

SUMMARY OF THE INVENTION

The present invention addresses the aforementioned and other problems in the prior art by providing a dynamic range compression technique that incorporates four novel concepts. The first is the use of a critical band multichannel structure for improved perceptual transparency. The second is the use of attack and release rates, instead of attack and release times, to affect gain control and adaptation of the compressor to changes in the input level. The rate of change of the level estimate, i.e., the attack rate or release rate, is monitored and limited to a predetermined level. This offers the advantage of audio level-independent and parameter-independent temporal control. The third concept involves a level estimate control mode which permits increased adaptability and user-control of the compressor response to various input signal waveforms. Finally, the fourth concept involves the normalization of the level estimates to reduce or eliminate spectral distortion. These concepts provide a dynamic range compressor with improved perceptual transparency, especially with respect to the perception of music.

The present invention incorporates a critical band multichannel structure which is implemented in the form of a filterbank which separates the input signal into 28 frequency bandwidths, each bandwidth representing a critical band envelope. Each of these envelopes is processed through a gain circuit that is controlled via a central processor unit to effect the appropriate compression within each bandwidth. The compressed envelopes are then combined to form a net output signal.

The present invention introduces attack and release rates in order to remove the level dependency associated with attack and release times. These rates are generally defined in terms of dB/ms, and are implemented as a multiplier value per sample, making them computationally more efficient than filtering methods. Two independent signal estimates are calculated, a peak level and an RMS level. The control signal follows the defined level estimate unless the estimate is changing faster than the designated rate. Otherwise, the rate of change is limited to the designated rate.

The present invention also introduces a mode control, which allows the user to specify the weighting associated with both the peak and RMS envelope. The gain control signal ranges from being based solely on the RMS envelope to solely on the peak envelope. At the center setting, the gain behavior follows the envelope with the higher level.

The present invention addresses the problem of spectral distortion by providing a similar amount of actual compression across all frequency bands, rather than providing similarly shaped compression curves for each bandwidth. The solution utilized in this invention requires that the estimated levels for all frequency bands have a similar average amplitude. The control signal for each band is normalized to a target level using slow attack and release rates compared with the attack and release rates utilized in the temporal gain control. This places the level estimate of each band at approximately the same point on the I/O curve. The exact position of the level estimate will depend on the individual signal contained in each band, preserving the shape of the amplitude envelope for each band. But since all the level estimates are approximately the same across all the bands, a similar amount of compression will occur for each band. The RMS level of the incoming signal is used to calculate the target level to which all frequency band level estimate are normalized.

BRIEF DESCRIPTION OF THE DRAWINGS

The aforementioned and other objects of the invention will be fully understood through the following description and the accompanying drawings.

DETAILED DESCRIPTION OF THE INVENTION

Figure 1:
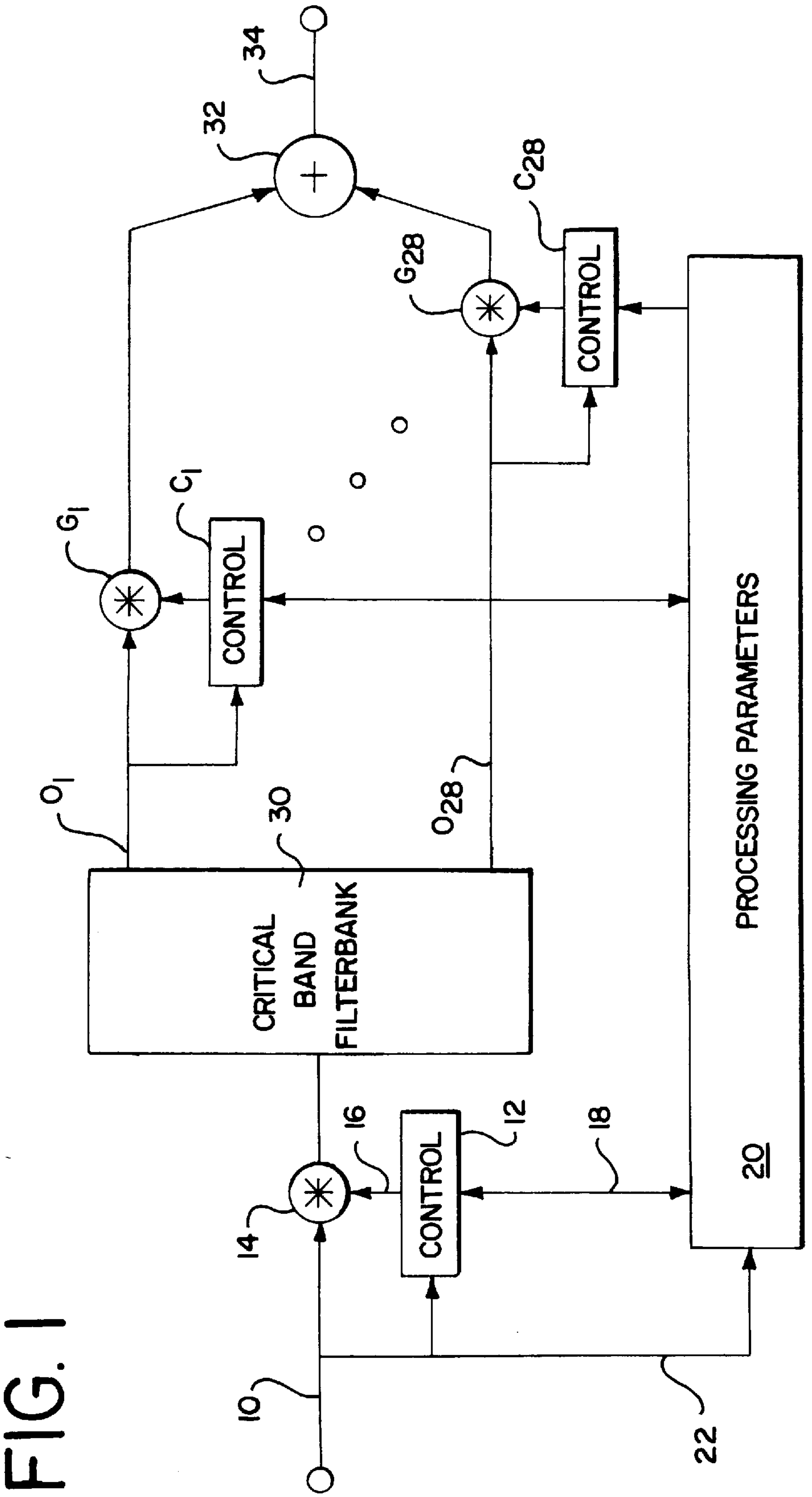
FIG. 1 is a block diagram illustrating the components of an audio signal compressor according to the invention.

Referring to FIG. 1, a compressor according to the present invention is comprised of an input signal carrier 10, an input signal gain control 12 and a gain element 14, which may comprise a voltage controlled amplifier which receives a control signal on line 16 from gain control 12. The function of the gain control 12 is to compress the input signal using slow time constants in order to maintain consistent long-term average levels and to effect compression without introducing any distortion artifacts. This practice is known conventionally as automatic gain control. Gain control 12 is provided with a control signal from processor 20 along line

18 according to the algorithm which is described herein. Processor 20 comprises programmed processor means in the form of a programmed digital computer which provides a control signal to gain control 12. Processor 20 is provided with the input signal on line 22. Alternatively, the gain control 12 and gain 14 could be eliminated and the input signal conveyed directly to filterbank 30.

Filterbank 30 comprises a 28-channel filter. The design of the critical band filterbank is crucial. A linear phase finite impulse response (FIR) filterbank is preferable to avoid phase cancellations when the signal is reconstructed. A steep transition band and a high stopband rejection are desired to truly isolate the frequency bands. A filter delay of no more than 10 ms (using a 44.1 kHz sample rate) and a filter bandwidth of 100 Hz are preferred. These design criterion, while rather demanding, are attainable using known filter design techniques.

Figure 2:
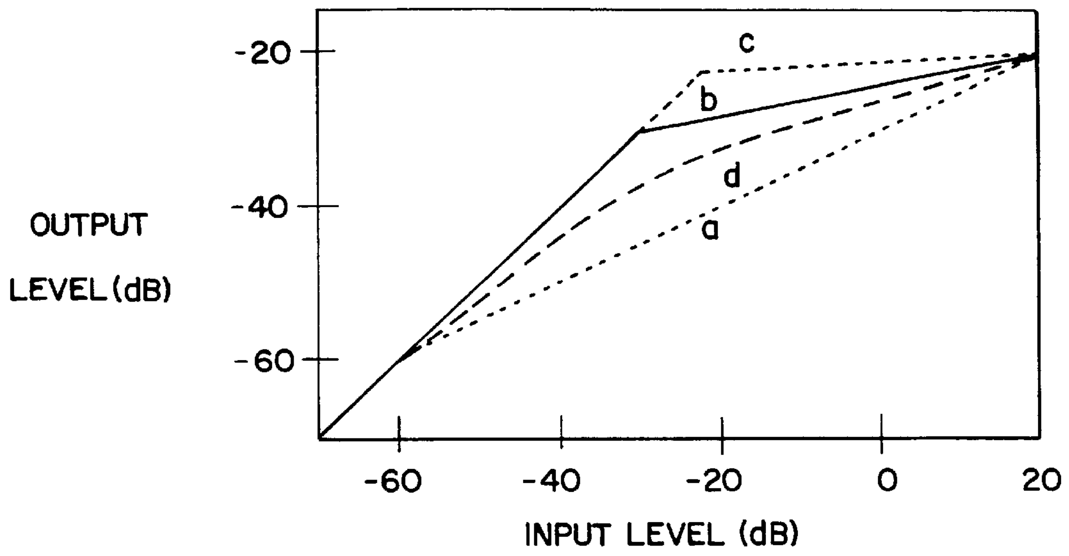
FIG. 2 illustrates four compression curves that are typical of audio compressors.

Filterbank 30 separates the input signal into 28 separate channels, although only two output lines $O_1$ and $O_{28}$ are illustrated in FIG. 2 for the sake of clarity. Compression is performed on the signal within each frequency band by gains $G_1$ through $G_{28}$ which, in turn, are controlled by controllers $C_1$ through $C_{28}$. Each controller $C_x$ is provided with a control signal from processor 20 according to the control algorithm which will be described below. The output signals are summed at summation block 32 to provide a net output signal on line 34. As will be evident to those of ordinary skill, gain control 12 as well as controllers $C_1$ through $C_{28}$, although represented as separate blocks from processor 20, are implemented through the same digital computer as is processor 20.

Figure 3:
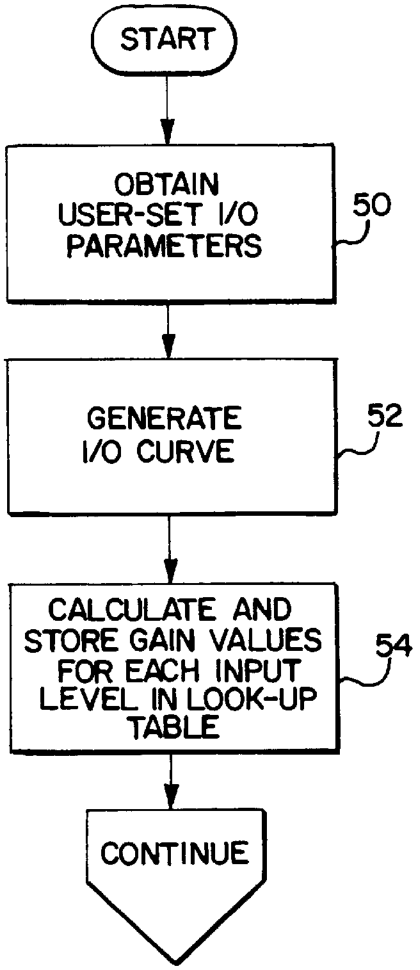
FIG. 3 is a flow chart illustrating the gain mapping table construction according to a preferred embodiment of the present invention.

Referring to FIGS. 2 and 3, the input/output mapping curve that characterizes the compressor is constructed within the memory of processor 20. As shown in FIG. 2, a number of different mapping curves may be implemented depending on parameters input by the user. These parameters may include the output limiting level, a compression threshold (the input level at which limiting begins), the compression ratio, and a smoothing value. For example, curve "a" represents a threshold of −60 dB and a compression ratio of 2:1. Curve "b" represents a threshold of −30 dB and a compression ratio of 4:1. Curve "c" represents a threshold of −22.5 dB and a compression ratio of 17:1. Curve "d" represents a soft-knee curve which closely approximates curve "b".

The gain table required to implement the desired input/output mapping is first constructed within the memory of processor 20 as illustrated in FIG. 3. At 50, the user-set parameters are obtained, i.e. by a user interface to processor 20. At 52, an input/output curve is generated according to the input parameters, preferably using a spline method for curve smoothing. At 54, gain values for each input level are calculated according to the input/output curve using the formula:

$$\text{Gain}=10^{(OutdB-IndB)/20}$$

The gain values for each input level are stored in memory in the form of a lookup table which offers a computationally efficient method of implementing gain control according to the remainder of the algorithm which will be described below.

Figure 4A:
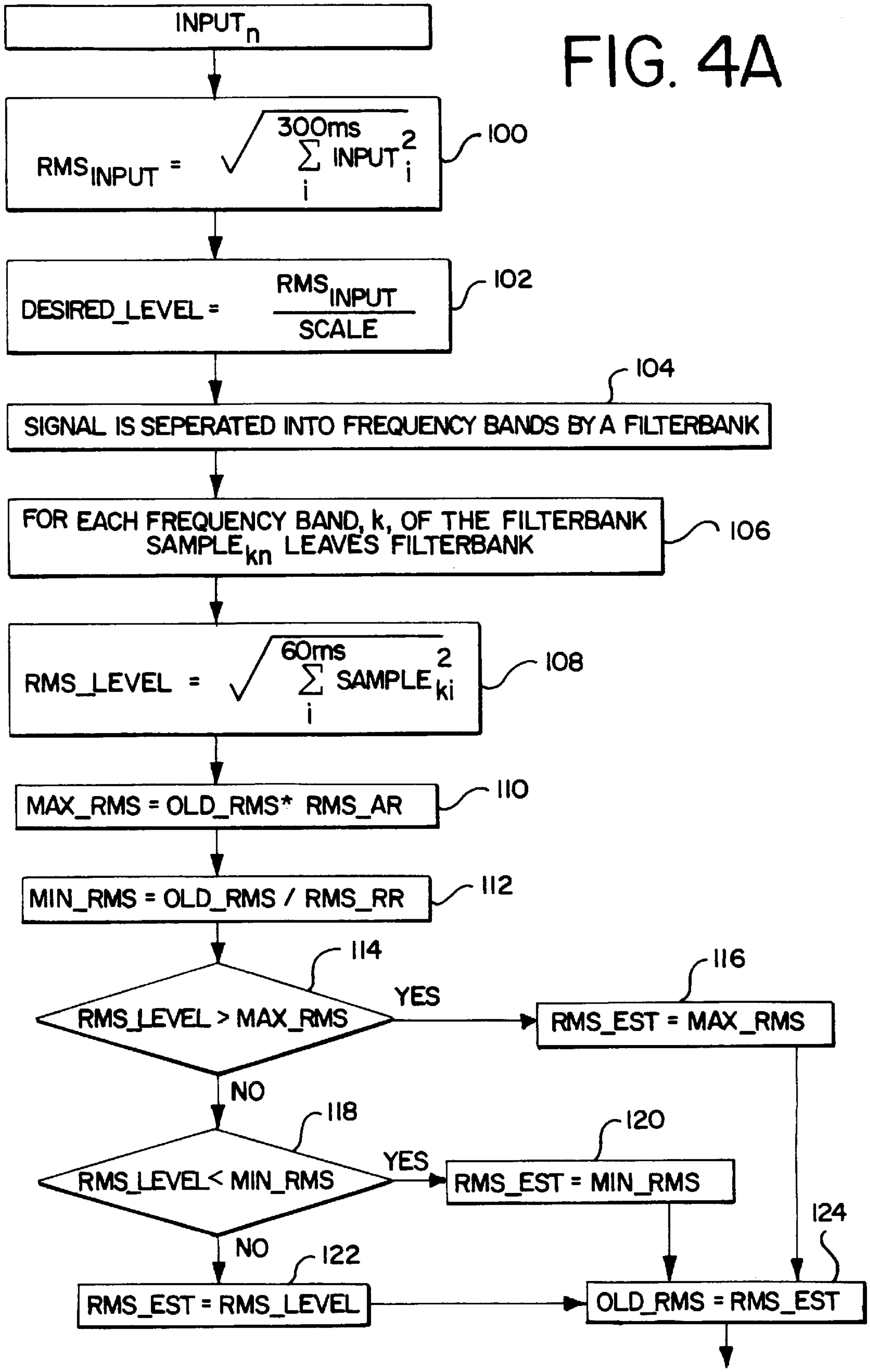
FIGS. 4A–4C represent a flow chart illustrating an algorithm for achieving audio signal compression according to the present invention.
Figure 4B:
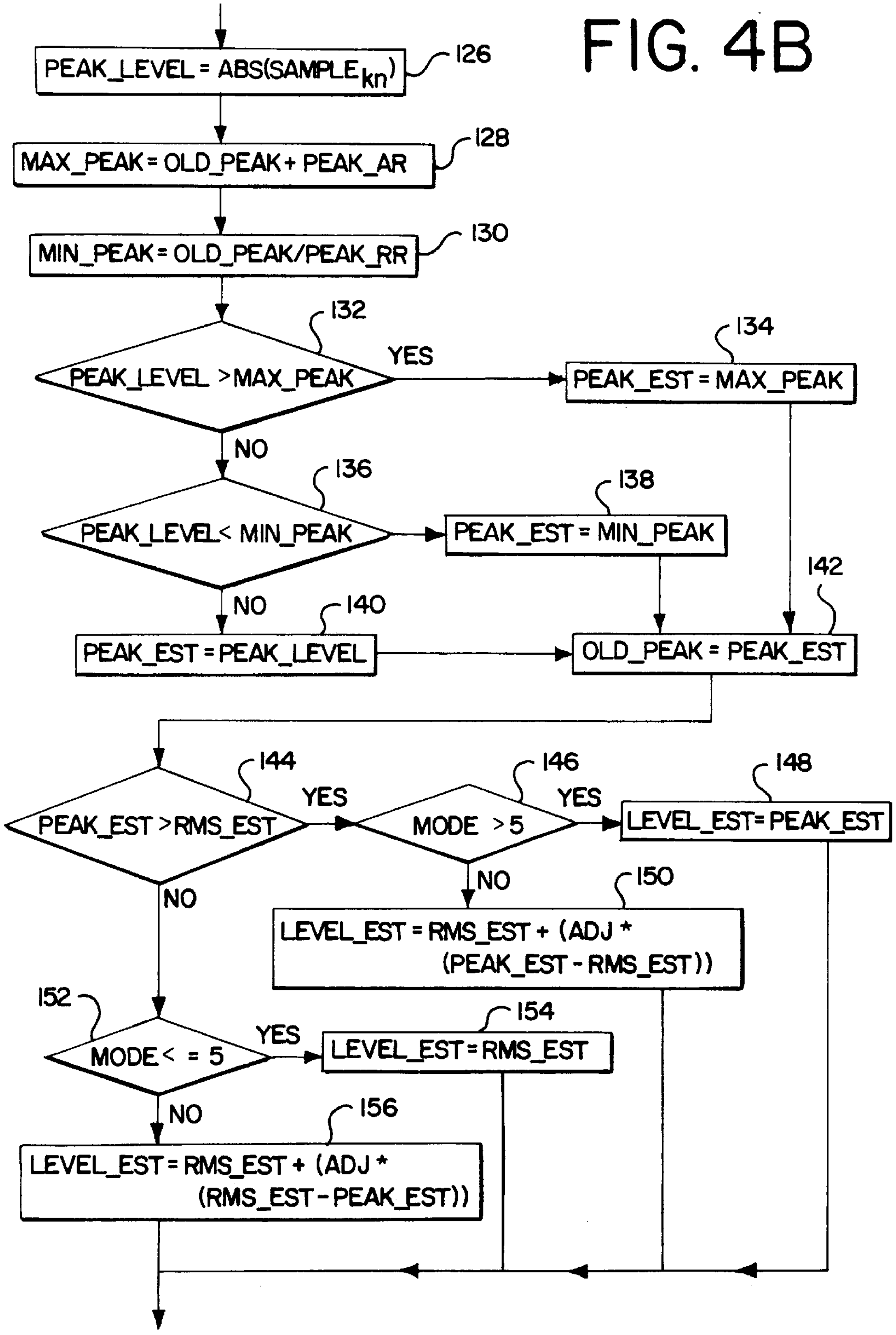
Figure 4C:
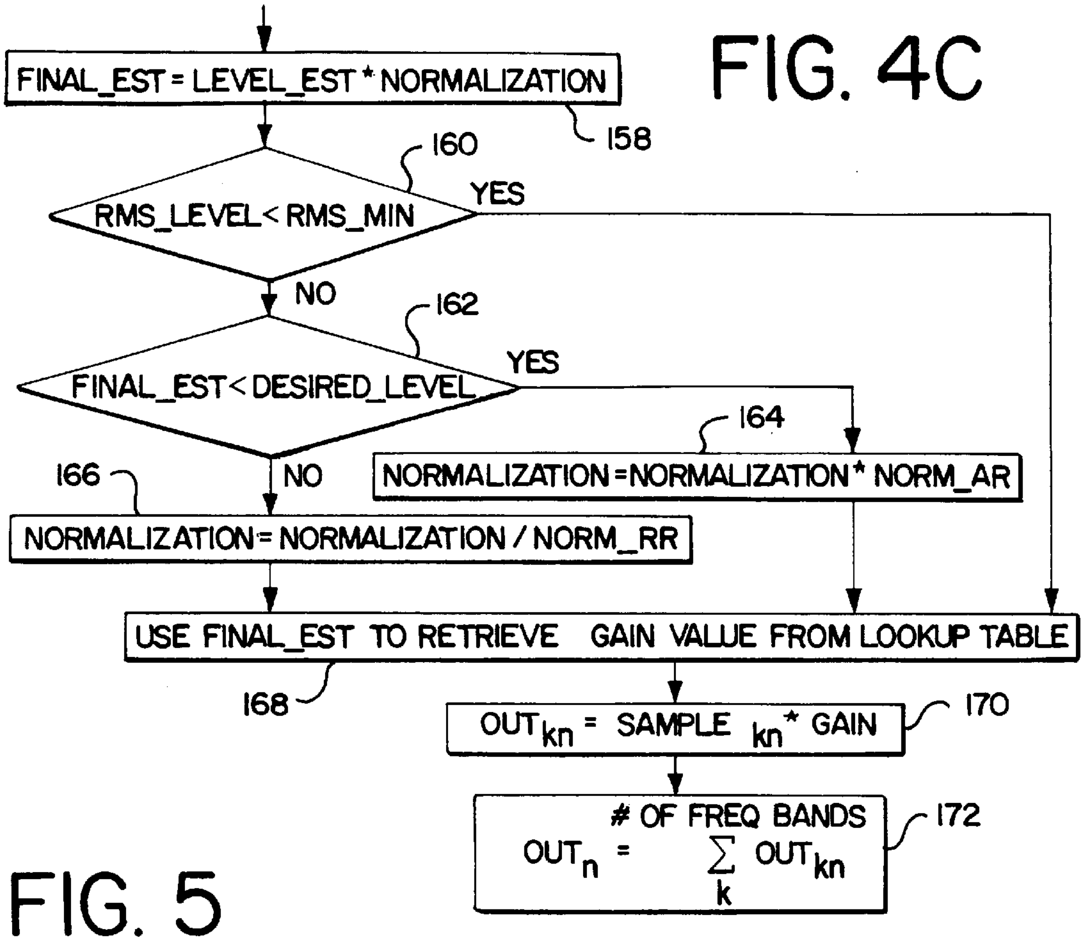

Referring to FIGS. 4A thru 4$C_1$ the algorithm for implementing the audio signal compression via each controller $C_x$ begins with a determination of the RMS voltage value for the original input signal level at step 100. This RMS value is preferably determined by calculating the RMS within a 300 millisecond window. At 102, the RMS value is used to determine a desired uniform level to which every level estimate envelope for each frequency band will be shifted later in the normalization routine. The desired value is calculated by dividing the RMS value calculated in step 100 by a SCALE factor, which represents a compression of the original input signal.

At block 104, the original input signal is separated into frequency bands by the filterbank 30 (FIG. 1) yielding a sample for each frequency band as represented in block 106 For each sample, the RMS LEVEL is calculated by a 60 ms window as represented by block 108.

Blocks 110 through 124 represent the determination of the RMS level estimate RMS EST for each frequency band. At block 110, a maximum RMS value MAX RMS is calculated by multiplying the value of OLD RMS by the attack rate associated with the RMS level estimate envelope, RMS AR. The value of RMS AR and RMS RR, the release rate associated with the RMS level estimate envelope, are specified by the user. OLD RMS is a value of RMS for the particular sample that was determined in a previous iteration of the control algorithm. MAX RMS represents the maximum RMS level that the algorithm will permit on the current iteration. Similarly, at block 112, MIN RMS is calculated by dividing OLD RMS by the release rate associated with the RMS level estimate envelope RMS RR to yield the minimum RMS level that the control routine will permit on the current iteration. At decision block 114, a determination is made as to whether the RMS level has increased beyond the bounds set by the RMS attack rate. If this has occurred, the routine branches to block 116 where the RMS estimate is set equal its upper bound for the current iteration. If at block 114, the RMS level does not exceed MAX RMS, then a determination is made at block 118 as to whether the RMS level is below the bounds set by the RMS release rate. If this has occurred, the RMS estimate is set to its lower bound for the current iteration at 120. If the tests at blocks 114 and 118 are both failed, the routine continues to block 122 where the RMS estimate is set to the RMS level. At 124, the value of OLD RMS is updated with the current value of RMS EST in preparation for the next iteration.

Blocks 126 through 142 represent the determination of the peak level estimate, PEAK EST for each frequency band. At block 126, the peak level is determined using the absolute value of the sample yielded in block 106 (FIG. 4A). Block 128 represents a determination of the maximum value that the peak estimate is allowed to achieve on the current iteration. MAX PEAK is determined by adding the peak attack rate PEAK AR to the previous value of the peak estimate OLD PEAK. Similarly, at block 130, the minimum boundary for the peak estimate on the current iteration is determined by dividing the previous peak estimate OLD PEAK by the peak release rate PEAK RR. At block 132, a determination is made as to whether the peak level exceeds the value of MAX PEAK. If so, the peak level is set to the value of MAX PEAK at block 134. If not, the routine proceeds to block 136 where a determination is made as to whether the peak level estimate is below the lower boundary MIN PEAK. If so, the peak level estimate is set equal to this lower boundary at 138. If the peak level is between the values of MAX PEAK and MIN PEAK, the peak level estimate PEAK EST is set equal to the peak level at block 140. At 142, the value of OLD PEAK is updated with the current value of PEAK EST in preparation for the next iteration.

As can be seen, the present invention incorporates attack and release rates, rather than attack and release times, in adjusting the gain control. This provides the advantage of level independent control of the gains since only the attack and release rates of the level estimate envelopes are examined, not the attack and release times of the level estimate envelopes. Limiting of the level estimates occurs as a function of the rate of change of the level estimate, not of the attack time and release time associated with a particular signal level. The result is a level independent and computationally efficient control technique. Preferred ranges for the peak attack rate are 1–99 V/ms, for the peak release rate 0.01–9 dB/ms, for the RMS attack rate 0.01–9db/ms and for the RMS release rate 0.01–0.9 dB/ms.

Blocks 144 through 156 represent the peak/RMS mode control implementation according to the present invention. At block 144, a determination is made as to whether the peak estimate exceeds the rms estimate, if that is so, and the mode selected is greater than 5, as determined at block 146, then the level estimate is set to the peak estimate at 148. As will be described below, a mode greater than 5 corresponds to a peak estimate biased control. If at block 146, the mode is 5 or less, the level estimate is determined at block 150 by increasing the RMS estimate by an amount corresponding to the difference between the peak and RMS estimates multiplied by an adjustment value ADJ. The value of ADJ is determined by the mode selected as will be described below. Where the peak estimate is less than or equal to the rms estimate, block 144 branches to block 152 where a determination is made as to whether the mode selected is 5 or less. If that is so, the level estimate is set to the rms estimate at block 154. If however, the mode selected is greater than 5, block 152 branches to block 156 where the level estimate is determined by increasing the RMS estimate by an amount corresponding to the difference between the RMS and peak estimates multiplied by an adjustment value ADJ.

The mode control generates a composite level estimate based on the peak and RMS level estimates which are determined as described above. The mode control provides user-control of the contribution of each of the peak and RMS level estimates to the temporal control of the compressor for each bandwidth. The user may specify mode settings of a value of 1 to 9 in order to adjust the contribution of each level estimate. For example a mode of 1 would correspond to the full RMS level estimate envelope being followed by the gain control with no contribution from the peak level estimate. On the other hand, a mode of 9 would correspond to the full peak level estimate envelope being followed with no contribution from the RMS level estimate. At a center setting of 5, the gain behavior would follow the level estimate envelope, either RMS or peak, that required the lowest gain, i.e, the envelope with the highest level. The mode control is implemented in the form of adjustment values that correspond to the mode selected. For example, a preferable mapping table for correlating the mode and adjustment value applied to each gain control would be as follows:

| Mode | Adjustment Value |
|---|---|
| 1 (RMS) | 0 |
| 2 | 0.125 |
| 3 | 0.25 |
| 4 | 0.5 |
| 5 | 1.0 |
| 6 | 0.5 |
| 7 | 0.25 |
| 8 | 0.125 |
| 9 (peak) | 0 |

Figure 5:
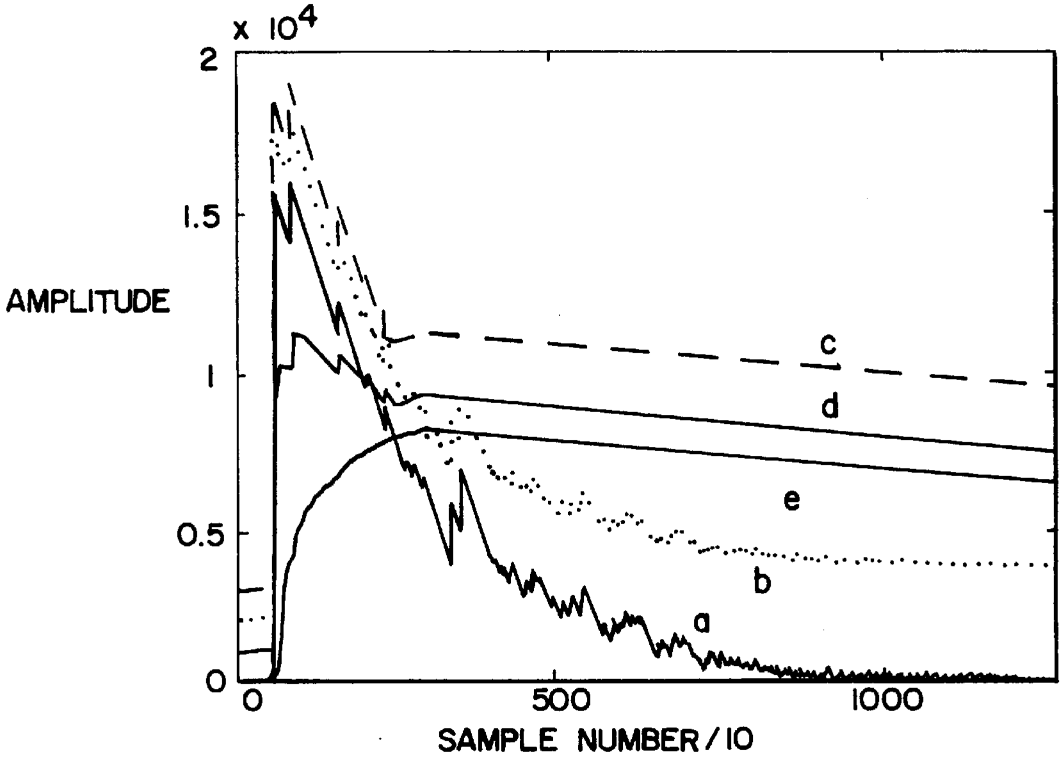
FIG. 5 represents level estimate envelopes for different control modes of a compressor according to the present invention.

Referring to FIG. 5, the level estimate envelopes resulting form an input audio waveform corresponding to a snare drum, for example, are illustrated for five different mode settings. The estimate envelopes are offset for clarity, but the general shape of the level estimate envelopes resulting from the different modes are evident. Waveform "a" corresponds to the full peak level estimate; waveform "e" corresponds to a full RMS level estimate. Waveforms "b", "c" and "d" correspond to mode control settings of 7, 5 and 3, respectively. Since waveform "a" corresponds to the instantaneous amplitude of the input signal at a given time, its shape most closely approximates the actual input signal waveform.

Referring again to FIGS. 4A–C, the level estimate normalization routine is illustrated in blocks 158 through 166. At block 158, the final estimate is calculated by multiplying the level estimate by a normalization factor, which was calculated on the previous iteration as will be described. At block 160, the rms level estimate is compared to the minimum rms value. If the rms level is below the minimum rms value, the final level estimate FINAL EST is used to retrieve the corresponding gain value from the lookup table. If at block 160, the rms level is equal to or greater than the rms minimum value, the final estimate is checked at block 162 to see if it is below the desired level, which was determined at block 102 based on the original input signal is used in the normalization routine. If the final estimate is below the desired value the normalization factor is multiplied at 164 by a value of NORM AR for the next iteration. The attack and release rates in this instance is not the same as those described in the level estimate determination. Rather, the attack and release rates are significantly slower (on the order of 6 dB/sec) in order to preserve the shape of the level estimate and merely change its offset. If, at block 162, the final estimate is not below the desired level, the normalization is reduced by dividing the current normalization factor by the normalization release rate NORM RR for the next iteration. The final estimate is then used at block 168 to retrieve the appropriate gain value from the lookup table. It should be noted that the normalization level adjustment represented by blocks 164 and 166 are bypassed at block 160 if the signal falls below a minimum level. This is necessary to prevent the normalization from tracking the signal into silent passages. Moreover, this leaves the normalization at a level that is appropriate for when the signal returns to that corresponding level.

At block 170, the output of each frequency band sample is multiplied by the appropriate gain to effect the desired compression. At block 172, the net output signal is computed by summing the compressed output signals over the number of frequency bands.

From the foregoing, it will be apparent that there is described a compression system for an audio signal which improves upon the prior art. Specifically, the compression system of the present invention offers a multichannel structure that is tuned to the critical bands of the human auditory system and thereby improves perceptual transparency. The compression system of the present invention also introduces a new approach to achieve temporal control of the gains applied to the audio signal by eliminating the use of attack and release times as a means for effecting control of the gains, and the introduction of attack and release rates as a level-independent parameter provides level-independent control of the compressor gains. The compression system according to the present invention also provides more adaptability of the temporal control by introducing control modes which utilize a composite level estimate which incorporates weighted contributions of both peak and RMS level estimates. This permits user-selection of various temporal control modes and eliminates the fixed topology of temporal control techniques of the prior art. The compression system according to the present invention also reduces the spectral distortion present in many prior art multichannel compression systems by providing a normalized level estimate for each bandwidth based on the level estimate of the original input signal. This provides a more accurate rendition of the original input signal and, when applied to hearing aid technologies, a more perceptually transparent compression system.

Other uses and modification of the foregoing embodiments will be apparent to those of ordinary skill without departing from the spirit and scope of the invention. For example, although a multichannel compression system is described as a preferred embodiment, it will be apparent to those of ordinary skill that various aspects of the invention, especially the use of attack and release rates and the level estimation mode control, are applicable to single channel compression systems. Moreover, although a digital implementation in the form of a programmed digital computer is described, it will be apparent to those of ordinary skill that various aspects of the invention may be accomplished using analog equivalents to the disclosed digital implementations. The foregoing is therefore intended to illustrate one or more preferred embodiments of the invention and should not be construed as limiting the scope of the invention which is defined in the appended claims.

What is claimed is:

1. A dynamic range compression device for an audio signal comprising:

a) filter means for separating the audio signal into separate signals, each within a respective frequency band;

b) means for determining a gain value for the signal in each frequency band comprising:

i) means for determining a level estimate of the signal in each frequency band;

ii) means for limiting the level estimate in each frequency band if the rate of change of said level estimate exceeds a predetermined rate; and iii) means for using the level estimate of the signal in each frequency band to select a corresponding gain value for that frequency band;

c) a band compressor for each frequency band for controlling the gain of said signal as a function of said corresponding gain value.

2. The device of claim 1, wherein the level estimate associated with each frequency band is limited to a predetermined attack rate when the level estimate is increasing and a predetermined release rate when the level estimate is decreasing.

3. The device of claim 1, wherein said gain values are determined by applying the respective level estimate to a gain look-up table.

4. The device of claim 1, wherein the filter means comprises a multichannel filter, the device further comprising means connected to an output of each the band compressors, for combining the signals output by the compressors to generate a composite output signal.

5. The device of claim 4, wherein the multichannel filter separates the audio signal into band corresponding to the critical bands of the human auditory system.

6. A dynamic range compression device for an audio signal comprising:

a) filter means for separating the audio signal into separate signals, each within a respective frequency band;

b) means for determining a gain value for the signal in each frequency band comprising:

i) means for determining a composite level estimate of the signal in each frequency band based on a peak level estimate and an RMS level estimate of the signal;

ii) means for using the composite level estimate of the signal in each frequency band to select a corresponding gain value for that frequency band;

c) a band compressor for each frequency band for controlling the gain of said signal as a function of said corresponding gain value.

7. The device of claim 6, wherein the respective contributions of the peak level estimate and the RMS level estimate to the composite level estimate are determined by a pre-selected weighting factor.

8. The device of claim 6, wherein said gain values are determined by applying the respective composite level estimate to a gain look-up table.

9. The device of claim 6, wherein the filter means comprises a multichannel filter, the device further comprising means connected to an output of each of the band compressors, for combining the signals output by the compressors to generate a composite output signal.

10. The device of claim 9, wherein the multichannel filter separates the audio signal into bands corresponding to the critical bands of the human auditory system.

11. A dynamic range compression device for an audio signal comprising:

a) filter means for separating the audio signal into separate signals, each within a respective frequency band;

b) means for determining a gain value for the signal in each frequency band comprising:

i) means for determining a level estimate of the audio signal;

ii) means for determining a level estimate of the signal in each frequency band;

iii) means for normalizing the level estimate of the signal in each frequency band based on the level estimate of the audio signal;

iv) means for using the normalized level estimate of the signal in each frequency band to select a corresponding gain value for that frequency band;

c) a band compressor for each frequency band for controlling the gain of said signal as a function of said corresponding gain value.

12. The device of claim 11, wherein the filter means separates the audio signal into bands corresponding to the critical bands of the human auditory system.

13. The device of claim 11, wherein the level estimate of the audio signal is determined based on the RMS power level of the audio signal.

14. The device of claim 11, wherein the gain for value for each frequency band is selected by applying the normalized level estimate of that frequency band to a gain look-up table.

15. A dynamic rang compression device for an audio signal comprising:

a) means for determining a gain value for the signal comprising:

i) means for determining a level estimate of the signal;

ii) means for limiting the level estimate if the rate of change of said level estimate exceeds a predetermined rate; and iii) means for using the level estimate of the signal to select a gain value for that frequency band;

b) a band compressor for controlling the gain of said signal as a function of said gain value.

16. A dynamic range compression device for an audio signal comprising:

a) means for determining a gain value for the signal comprising:

i) means for determining a composite level estimate of the signal based on a peak level estimate and an RMS level estimate of the signal;

ii) means for using the composite level estimate of the signal to select a gain value for that frequency band;

b) a band compressor for controlling the gain of said signal as a function of said gain value.

* * * * *